Sept. 22, 1964   R. JURENZ   3,149,547
FOCUSING PLATE FOR A PHOTOGRAPHIC CAMERA VIEWFINDER
Filed Jan. 5, 1961   2 Sheets-Sheet 1

Inventor
ROLF JURENZ
By Irwin J. Thompson
Attorney

Sept. 22, 1964         R. JURENZ              3,149,547
         FOCUSING PLATE FOR A PHOTOGRAPHIC CAMERA VIEWFINDER
Filed Jan. 5, 1961                                2 Sheets-Sheet 2

Inventor
ROLF JURENZ
By Irvin A. Thompson
Attorney

United States Patent Office 3,149,547
Patented Sept. 22, 1964

3,149,547
FOCUSING PLATE FOR A PHOTOGRAPHIC CAMERA VIEWFINDER
Rolf Jurenz, Dresden, Germany, assignor to VEB Kamera- und Kinowerke Dresden, Dresden, Germany
Filed Jan. 5, 1961, Ser. No. 80,846
4 Claims. (Cl. 95—44)

The invention relates to a focusing plate for a photographic camera viewfinder, such as is used in reflex cameras for sharp focusing.

It is already known to equip such focusing plates with coincidence wedge pairs in the middle of the view finder picture, which effect a parallatic image shift in the case of an incorrect setting. In order to improve the possibilities of setting it has already become known to use a focusing plate containing, each in self-contained arrangement, a light-permeable part, a light-scattering (frosted) part and a part provided with elements for the parallactic image shift. The arrangement is here made such that the parts for the sharp focusing (frosted surface and sharpness indicator) are situated in the middle of the setting disc and are surrounded by the clearly transparent field.

A focusing plate in such embodiment has the advantage that where a Fresnel or image field lens is used a good edge brightness can be achieved and also the possibilities of sharp focusing are not limited to the sharpness indicator, which as is known can only be used limitedly in the case of the lack of marked vertical lines. It is however disadvantageous that the image brightness is greatly reduced in the region of the frosted surface, if the grain of the frosted surface possesses the fineness necessary for the exact sharp focussing.

According to a solution suggested and known elsewhere, around the sharpness indicator in the middle of the focussing plate there is arranged an annular clear surface and the image field surrounding this is made as a frosted surface.

The major part of the view finder image area is thus frosted, and as already shown from the above-described example, is greatly reduced in brightness. This disadvantage is not even outweighed by the achieved advantage that a second measurement range, namely due to the image shift between each of the measurement wedges and the clear glass ring, is discovered.

Now it is the problem of the invention to provide a focusing plate which, apart from the sharp focusing with the aid of a coincidence wedge pair, offers a further possibility of sharp focusing even for objective lenses of low light intensity, and at the same time at least approximately ensures the brightness of the view finder image which can be achieved with a clear glass surface.

The invention consists of a viewfinder focusing plate for a photographic camera, comprising a coincidence wedge pair in the middle part of the plate, a plurality of cylindrical, image-distoring, focus-indicating lenses which surround the wedge pair, and a plurality of Fresnel rings which surround the lenses.

The provision of cylindrical lenses surrounding the wedge pair causes a region of the image to be both blurred and distorted when the image is out of the correct focusing position. When the objective is adjusted to the correct focusing position, the image will be seen to come suddenly into focus, the blurred and distorted image revolving into a clear image. At the same time the wedge pair will cause the split image at the center to come into coincidence so that the whole image area becomes clear and the operator then knows that focusing has been properly effected. In a preferred form of embodiment of the invention the elements arranged around the coincidence wedge pair for the parallactic image-shift are made of such width that they lie beneath the limit of the resolving power of an eye equipped with a view finder eye piece, that is to say themselves cannot be recognised. This arrangement has the effect that many very small image parts are distorted on incorrect setting and thus the impression is obtained of lack of sharpness for the observer. In the case of annular arrangement of image-distorting elements (cylinder lenses) the distorting effect is the greatest in the middle of the individual quadrants and reduces along the horizontal and vertical axes of the view finder picture until in the axial region itself it is no longer present. In the case of an incorrect setting thus a picture is produced which is sharp in the vicinity of the axes and is lacking sharpness in the centre of the individual quadrants. The transitions from the great lack of sharpness to the sharpness range in the axial vicinity are here continuous. If in the arrangement of image-distoring cylinder lenses the square figure standing on a corner is preferred, the entire setting range possesses uniformly great distortions in the individual sections, that is to say uniform lack of sharpness.

Possible forms of embodiments of focusing plates in accordance with the invention are to be explained hereinafter by reference to examples. Here all details have been omitted which are not directly connected with the invention.

Figure 1:
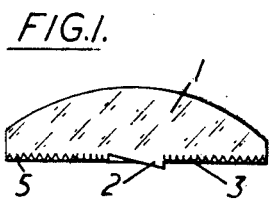
FIGURE 1 shows the cross section of a focusing plate constructed as an image field lens with a coincidence wedge pair and cylindrical lenses arranged annularly around this coincidence wedge pair.
Figure 2:
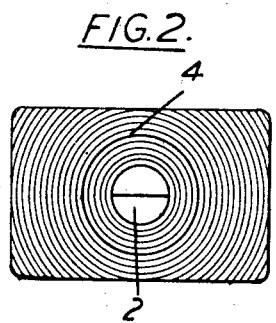
FIGURE 2 shows a plan view of FIGURE 1.

The image field lens 1 as shown in FIGURES 1 and 2 possesses a coincidence wedge pair 2 of the usual nature, which is surrounded with annular cylinder beads. Outside the range of especial interest for the sharp focusing, the limit of which is indicated by the line 4 in FIGURE 2, the image field lens 1 possesses Fresnel rings 5 for brightening the viewfinder image edge. The view finder image, not yet sharply focussed, in the region of the Fresnel rings 5 appears sharply to the observer and in the region of the coincidence wedge pair appears sharply with contours staggered in relation to one another. In the region of the annular cylinder beads 3 the view finder image appears sharp in the vicinity of the horizonal and vertical view finder image axes, as already described, and in the centre of the individual quadrants it appears in the maximum lack of sharpness caused by image distortion. After sharp focusing has been effected the entire view finder image field appears glass clear and sharp.

Figure 3:
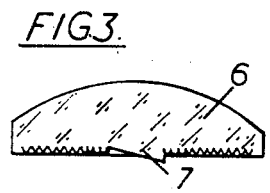
FIGURE 3 shows the cross section of an image field lens with a quadratically limited coincidence wedge pair and similarly quadratic figures around this, which are formed by cylinder lenses.
Figure 4:
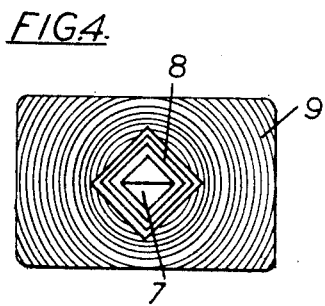
FIGURE 4 shows a plan view of FIGURE 3.

The image field lens 6 according to FIGURES 3 and 4 possesses a quadratically defined coincidence wedge pair 7 and similarly quadratic figures 8 formed by cylinder lenses, around the wedge pair. The four cylinder lenses forming the external square at the same time indicate the limits of the setting range of particular interest, which as already shown in FIGURES 1 and 2 is surrounded by a view finder image area 9 equipped with Fresnel rings. Before the sharp focusing the image already mentioned in the description of FIGURES 1 and 2 is offered to the observer in the region of the Fresnel rings and in the region of the coincidence wedge pair. In the region of the square figures 8 formed of cylinder lenses, the view finder image appears uniformly lacking in sharpness due to equal image distortion at every point in every cylinder lens. After sharp focusing is achieved the same clear and sharp view finder image is shown as in the case of the embodiment according to FIGURES 1 and 2.

Figure 5:
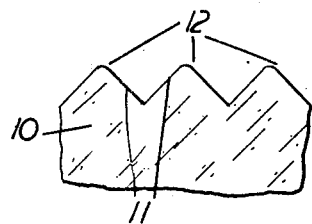
FIGURE 5 shows an enlarged partial section through an image field lens with prismatic counter sinkings, wherein the points are rounded off.

The embodiment of a focusing plate 10 as illustrated in cross section in FIGURE 5 effects in the region of the straight prismatic surfaces 11 a parallactic image displacement and on the rounded crowns 12 of the prismatic counter sinkings and image distortion. The lack of sharpness of the view finder image, occurring on setting with such a focusing plate, is thus effected both by the parallactic image shift and also by image distortion.

Figure 6:
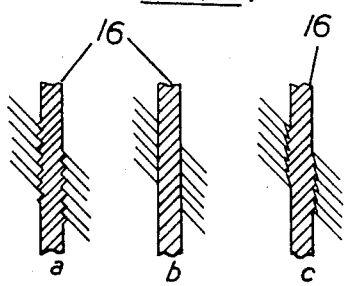
FIGURES 6a to 6c show a setting example in the case of the use of image-distorting cylinder beads on a vertical edge.
Figure 7:
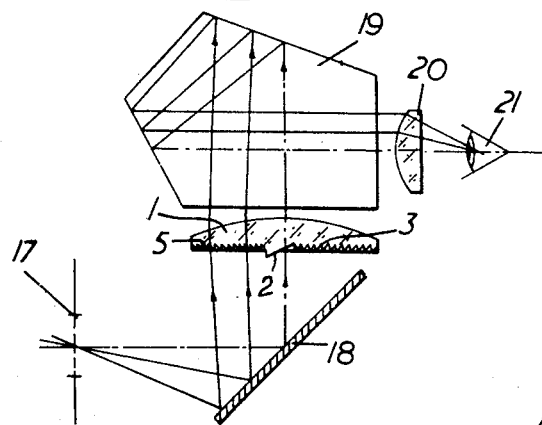
FIGURE 7 shows a diagrammatic representation of the ray path in a view finder arrangement of a mirror reflex camera using a focusing plate in accordance with the invention.

FIGURE 6a shows a marked vertical line 16, as might be part of the view finder image, the plane of sharpness lying beneath the focusing plane. FIGURE 6b shows the same line 16 in the case of correct setting and FIGURE 6c the same line again in the case of sharpness plane lying above the focusing plane. As shown in FIGURE 7, a focusing plate 3 according to FIGURES 1 and 2 is used in a photographic mirror reflex camera. FIGURE 7 shows an exit pupil 17 of a picture taking objective lens (not shown), a mirror 18, the image field lens 3, a pentahedral roof prism 19, a view finder eye piece 20 and the observing eye 21. The illustrated ray path shows that rays emitted by the exit pupil 17 are reflected by the mirror 18 to the image field lens 3 and directed parallel in the region of the Fresnel rings 5. Due to the domed surface of the image field lens 3 and the view finder eye piece 20 the exit pupil 17 is reproduced in the viewing eye 21.

The pentahedral roof prism arranged between the image field lens 3 and the view finder eye piece 20 serves, as is known, for the image reversal.

I claim:

1. A viewfinder focusing plate for a photographic camera, comprising a coincidence wedge pair in the middle part of the plate, a plurality of image-distorting, focus-indicating lenses which surround the wedge pair, each of said lenses being formed geometrically by a cylindrical portion and a prism portion, and a plurality of Fresnel rings surrounding the cylindrical lenses.

2. A viewfinder focusing plate for a photographic camera, comprising a circular coincidence wedge pair in the middle part of the plate, a plurality of annular, image-distorting, focus-indicating lenses surrounding the wedge pair, each of said lenses being formed geometrically by a cylindrical portion and a prism portion, and a plurality of Fresnel rings surrounding the annular cylindrical lenses.

3. A viewfinder focusing plate for a photographic camera, comprising a square coincidence wedge pair in the middle part of the plate, a plurality of square, image-distorting, focus-indicating lenses which surround the wedge pair, each of said lenses being formed geometrically by a cylindrical portion and a prism portion, and a plurality of Fresnel rings surrounding the cylindrical lenses.

4. In a photographic camera, having a pentahedral prism viewfinder device, the provision of a viewfinder focusing plate under the prism, consisting of a domed surface on the side adjacent the pentahedral prism, a coincidence wedge pair in the middle part of the plate side remote from the pentahedral prism, a plurality of image-distorting, focus-indicating lenses on the same side of the plate as the wedge pair, which surround the latter, each of said lenses being formed geometrically by a cylindrical portion and a prism portion, and a plurality of Fresnel rings which surround the cylindrical lenses situated on the same side of the plate as said wedge pair.

References Cited in the file of this patent

UNITED STATES PATENTS

| | | |
|---|---|---|
| 2,881,686 | Ruhle | Apr. 14, 1959 |
| 2,969,706 | Rosier | Jan. 31, 1961 |

FOREIGN PATENTS

| | | |
|---|---|---|
| 753,376 | Germany | Feb. 9, 1953 |
| 1,107,591 | France | Aug. 10, 1955 |